United States Patent
Koplar

(10) Patent No.: US 12,369,593 B2
(45) Date of Patent: Jul. 29, 2025

(54) WINDING MACHINE FOR DOUGH AND METHOD

(71) Applicant: Richard Koplar, Dießen am Ammersee (DE)

(72) Inventor: Richard Koplar, Dießen am Ammersee (DE)

( * ) Notice: Subject to any disclaimer, the term of this patent is extended or adjusted under 35 U.S.C. 154(b) by 0 days.

(21) Appl. No.: 18/390,363

(22) Filed: Dec. 20, 2023

(65) Prior Publication Data

US 2024/0114911 A1 Apr. 11, 2024

Related U.S. Application Data

(63) Continuation of application No. 16/499,779, filed as application No. PCT/EP2018/058071 on Mar. 29, 2018, now Pat. No. 11,849,732.

(30) Foreign Application Priority Data

Mar. 30, 2017 (DE) ...................... 10 2017 003 122.3
Jul. 3, 2017 (EP) ...................... 17179335

(51) Int. Cl.
*A21C 3/06* (2006.01)
*A21B 5/02* (2006.01)
(Continued)

(52) U.S. Cl.
CPC .................. *A21C 3/06* (2013.01); *A21C 3/10* (2013.01); *A21C 9/00* (2013.01); *A21C 9/045* (2013.01);
(Continued)

(58) Field of Classification Search
CPC .................................... A21C 1/08; A21C 3/06
(Continued)

(56) References Cited

U.S. PATENT DOCUMENTS

| | | | | |
|---|---|---|---|---|
| 754,549 A | * | 3/1904 | Dietz | ...................... B29C 53/12 |
| | | | | 425/391 |
| 4,690,348 A | * | 9/1987 | Watanabe | .............. B65H 18/00 |
| | | | | 242/541.3 |

(Continued)

FOREIGN PATENT DOCUMENTS

| | | |
|---|---|---|
| DE | 248280 A5 | 8/1987 |
| EP | 1726209 B1 | 11/2013 |

(Continued)

OTHER PUBLICATIONS

Machine English translation of Cheon (KR-1666827-B1) (Year: 2016).*

(Continued)

*Primary Examiner* — Jeffrey M Wollschlager
*Assistant Examiner* — Edgaredmanuel Troche
(74) *Attorney, Agent, or Firm* — Rimon Law, P.C.

(57) ABSTRACT

The invention relates to a winding machine for dough, in particular for winding dough strips, and to a method for winding dough using such a machine, wherein the winding machine comprises: a main body; a control unit; a roller which is rotatably mounted on the main body about a rotational axis, wherein dough strips can be wound onto the roller when the winding machine is in use; a motor for rotationally driving the roller; and a pressing device for pressing dough, which is rolled up on the roller, against the roller.

13 Claims, 5 Drawing Sheets

(51) Int. Cl.
  *A21B 5/04* (2006.01)
  *A21C 3/10* (2006.01)
  *A21C 9/00* (2006.01)
  *A21C 9/04* (2006.01)
  *A21C 9/06* (2006.01)
  *A21C 11/00* (2006.01)
  *A21C 14/00* (2006.01)
  *A21C 15/02* (2006.01)
  *B29C 35/12* (2006.01)

(52) U.S. Cl.
  CPC ............ *A21C 9/063* (2013.01); *A21C 11/006* (2013.01); *A21C 15/02* (2013.01); *A21C 15/025* (2013.01); *A21B 5/02* (2013.01); *A21B 5/04* (2013.01); *A21C 11/008* (2013.01); *A21C 14/00* (2013.01); *B29C 35/12* (2013.01)

(58) Field of Classification Search
  USPC ........................................................ 426/517
  See application file for complete search history.

(56) References Cited

U.S. PATENT DOCUMENTS

| | | | | |
|---|---|---|---|---|
| 6,254,916 | B1 * | 7/2001 | Haas ..................... | A21C 15/025 99/450.2 |
| 2005/0000369 | A1 * | 1/2005 | Cunningham ........... | A21C 3/06 99/450.1 |
| 2005/0260315 | A1 * | 11/2005 | Shinomiya ............ | A21C 15/025 426/514 |
| 2012/0183707 | A1 * | 7/2012 | Anderson ............... | B28B 21/78 264/639 |
| 2015/0201625 | A1 * | 7/2015 | Goldstein ................ | A21C 3/06 425/319 |
| 2016/0113293 | A1 * | 4/2016 | Zaleski, Jr. ............. | A23P 30/25 425/464 |

FOREIGN PATENT DOCUMENTS

| | | | | |
|---|---|---|---|---|
| JP | 2010207122 | A * | 9/2010 | ............... A21B 5/04 |
| KR | 200192033 | Y1 * | 8/2000 | |
| KR | 1666827 | B1 * | 10/2016 | ................ A23P 1/08 |

OTHER PUBLICATIONS

Machine Englsih translation of Kwak Bo Shin (KR-200192033-Y1) (Year: 2000).*

Machine Englsih translation of Shimada (JP-2010207122-A) (Year: 2010).*

CA 3058545, Office Action issued May 28, 2024.

German Office Action dated Jan. 27, 2025 regarding German Application No. 10 2017 003 122.3; 3 pp.

* cited by examiner

WINDING MACHINE FOR DOUGH AND METHOD

CROSS-REFERENCE TO RELATED APPLICATIONS

This application is a continuation of U.S. patent application Ser. No. 16/499,779 filed on Sep. 30, 2019 which is a 35 U.S.C. 371 national stage filing from International Application No. PCT/EP2018/058071 filed Mar. 19, 2018 which claims the benefit of EPO 17179335.9 filed on Jul. 3, 2017 and DE 10 2017 003 122.3 filed on Mar. 30, 2017.

BACKGROUND OF THE INVENTION

Field of the Invention

The invention relates to a winding machine for dough, in particular for winding dough strips for producing chimney cakes or Kürtöskalács. Furthermore, the invention relates to a method for winding dough.

Description of the Prior Art

Chimney cake is a pastry, which is traditionally prepared in manual work. Thereto, dough strips or dough strands (e.g. of yeast dough) are helically wound onto a cylindrical roller by hand such that adjacent edges of the dough strip at least contact each other or also overlap. Winding can also be effected such that adjacent strip sections first lie on the roller in spaced manner Subsequently, the wound dough is smoothed by rolling the roller on a base, whereby the juxtaposed strip sections are pressed or tumbled and laterally abut on each other. By smoothing, it is achieved that a dough layer as uniformly thick as possible is present on the roller. The dough on the roller is cooked or baked by continuously rotating in front of a heat source such as e.g. an electric grill, a gas grill, a charcoal grill or a fireplace. After the dough is done, it is detached from the roller such that a hollow or tubular pastry piece is present. Winding the dough for producing chimney cakes is very time-consuming and requires some skill. The pastry here known as chimney cake is also known as Kürtökalács.

SUMMARY

It is the object of the invention to provide a winding machine for dough and a method for winding dough, respectively, which allow fast and simple winding of dough. This object is solved by the features of the claims. Advantageous embodiments are the subject matter of the dependent claims.

A winding machine for dough and dough strips, respectively, is provided. The winding machine comprises: a main body or a housing, a control unit, a roller mounted on the main body (or housing) rotatable around a rotational axis, a motor (e.g. electric motor) controlled by the control unit for rotationally driving the roller, and a pressing device. In using the winding machine, dough strips can be wound onto the roller or dough strips are wound onto the roller. The dough can be helically or spirally wound such that adjacent or juxtaposed dough edges abut on each other or also overlap. After winding the dough strip(s), the entire (circumferential surface of the) roller or substantially the entire (circumferential surface of the) roller is preferably wrapped or covered with dough.

By means of the pressing device, dough wound on the roller is pressed/squeezed onto the roller. The pressing device is formed to squeeze/press against the roller or the circumferential surface of the roller such that dough wound on the roller is pressed against the roller and rolled flat in use. Rolling flat or pressing flat of wound dough results in the fact that dough sections juxtaposed on the roller bake together in subsequent baking and the baked dough remains as an entire piece upon stripping the baked dough from the roller. However, for consumption, the windings can be again easily detached from each other such that (e.g.) the chimney cake (Kürtökalács) can be divided into small portions.

Preferably, the pressing device is an element connected or connectable to the winding machine. In an embodiment, the pressing device can be an element not connected to the winding machine, which is manually or automatically actuated towards the roller mounted in the winding machine for pressing the wound dough. Preferably, the actuation of the pressing device (independently of the fact whether or not it is mounted on the winding machine) towards the roller mounted in the winding machine is manually or automatically effected. The automatic actuation can be effected by means of an actuating device, which acts on the pressing device.

Subsequently, the steps of a method for winding dough with a winding machine as described above are exemplarily described:
rotating or turning the roller in a first rotational direction by means of the motor,
helically winding a dough strip or multiple dough strips onto the rotating roller,
(optionally) reversing the rotational direction of the roller or rotating the roller in a second rotational direction opposite to the first one,
pressing the wound dough onto the roller by means of the pressing device. Pressing the dough can be effected by actuating or pivoting the pressing device towards the roller such that wound dough is pressed onto the roller. Therein, pressing can partially already be effected during winding.

After pressing the dough onto the roller, the rotation of the roller can be stopped or the rotation of the roller can be halted.

Winding the dough in a roller rotational direction and pressing in the roller rotational direction opposite thereto or the reversal of the direction of the rotational direction ensures better adhesion of the dough to the roller. In pressing/squeezing, the roller can optionally be rotated or rotate in the same direction as in winding.

Advantageously, the roller mounted on the main body or housing is mounted manually removable and installable. Particularly advantageously, the roller is removable and installable without tool. In this manner, after winding dough onto the roller, the wrapped roller can be simply and fast removed from the machine by hand and a new (empty) roller can be equally simply and fast inserted and subsequently be wrapped with dough.

For transferring the torque of the motor to the roller, a motor shaft of the motor is preferably connected to the roller or to a roller axis of the roller in detachable and form-fit and/or force-fit and/or frictionally engaged manner. For transferring the torque of the motor to the roller, at least one side/one end of the roller or the roller axis for example comprises a first form-fit and/or force-fit and/or frictionally engaging element, which engages with a second form-fit and/or force-fit element of the motor or the motor shaft. Preferably, the first form-fit and/or force-fit element is again detachably connectable to the second form-fit and/or force-fit element in manual manner and/or without tool. For example, the roller axis can be plugged onto the motor shaft. Examples for possible connections between shaft axis and motor shaft are: pin connection, feather key connection, splined connection, toothed shaft connection, polygon shaft connection or spur gearing.

Advantageously, the pressing device is mounted on the main body in an actuable or pivotable and rotatable manner, respectively, such that it can be actuated or pivoted towards the roller for pressing wound dough onto the roller. Instead of actuation by means of pivoting, actuation can also be effected by a linear movement or by a combination of linear and pivoting movement of the pressing device.

Preferably, the pressing device comprises at least one pressing roll mounted rotatably around a rotational axis, wherein the roll rotational axis of the at least one pressing roll is preferably parallel or substantially parallel to the roller rotational axis. In pressing/squeezing flat of wound dough, the at least one pressing roll rotates with or the pressing roll rolls over the wound dough such that adhesion of the dough to the roll or the pressing device is prevented.

Particularly preferably, the pressing device comprises at least two pressing rolls, preferably exactly three pressing rolls, exactly four pressing rolls or exactly five pressing rolls. Alternatively, the pressing device comprises between two and ten pressing rolls, preferably between two and seven pressing rolls. By providing multiple small pressing rolls, the contact pressure of the pressing device is uniformly distributed such that the wound dough does not stick to the rolls during squeezing/pressing.

Advantageously, the pressing device comprises a mount, on which the at least one pressing roll is rotatably mounted, wherein the mount is pivotably/rotatably mounted on the main body. For example, the mount comprises two side parts, wherein the pressing roll(s) or the axis(s) thereof connect(s) the two side parts to each other. Preferably, the pressing device is manually pivotable/rotatable such that the contact pressure on the wound dough can be finely metered. Thereto, the pressing device for example comprises a grip element.

Preferably, the pressing device, in particular the mount, is biased towards the roller by means of at least one spring element. By the at least one spring element, a uniform contact pressure on the roller and the wound dough, respectively, is ensured during pressing/squeezing flat. However, providing the spring element is optional.

Advantageously, the pressing device, in particular the mount, is fixable in a rest position located spaced from the roller by means of at least one retaining element. By means of the retaining element, the pressing device is prevented from inadvertently pivoting towards the roller during the winding of the dough or when changing the rollers. In providing the at least one above mentioned spring element, the retaining element maintains the pressing device in the rest position against the pressure of the spring element. For example, a securing pin or a locking element can be provided as the retaining element.

Preferably, the winding machine comprises a first switching element connected to the control unit for switching on/off the motor. Particularly preferably, the first switching element is formed as a foot switch or pedal such that a user has both hands free in using the winding machine to hold and guide the dough in winding.

According to an embodiment, the winding machine comprises a second switching element connected to the control unit for reversing the rotational direction of the motor. For example, this switching element can be formed as a switch on the main body or housing or also as a foot switch. This device for reversal of the rotational direction (e.g. a switching element for the rotational direction) allows the reversal of the rotational direction for example between the step of winding the dough and the step of pressing the dough onto the roller. Or if an operator of the winding machine incorrectly winds the dough strip onto the roller, the already wound dough strip can again be easily unwound by the reversal of the rotational direction e.g. to newly wind it again in correct manner.

Particularly advantageously, the winding machine comprises a third control element connected to the control unit for controlling the rotational speed of the motor, in particular for variably controlling the rotational speed. In this embodiment too, the control element or the speed regulator or control member can be operable by the foot such that a user has both hands free during winding and pressing dough. For example, the rotational speed of the roller can thus be (continuously) adapted according to consistency of the dough to be processed. In an embodiment, the on/off switch for the motor is coupled to the speed regulator or control member such that switching on and adjusting the speed can be effected by only a foot movement.

Alternatively, a first (predetermined) rotational speed of the motor or the roller can be used for winding dough and a second (predetermined) rotational speed can be used for pressing the wound dough. For example, the speed in winding is higher than in pressing. Further alternatively, the same speeds can be used for winding and pressing.

The (preferably variably controllable or predetermined) rotational speed of the motor in at least one rotational direction can be between 30-250 $min^{-1}$ (revolutions/minute), 60-200 $min^{-1}$, 80-150 $min^{-1}$, 90-130 $min^{-1}$, preferably at maximally or substantially maximally 120 or 180 $min^{-1}$ or at 180±20% $min^{-1}$.

Preferably, the circumferential surfaces of the roller and the at least one pressing roll are parallel to each other, in particular in each pivot position of the pressing device. Thereby, a uniform contact pressure as well as a uniform thickness of the pastry is ensured such that the wound dough subsequently uniformly bakes. The roller and the pressing roll(s) can for example be cylindrically or conically formed.

The roller and/or the pressing rolls, in particular the (outer) surfaces of the roller and/or the pressing rolls coming into contact with dough, can be formed of at least one of the following materials or be coated with at least one of the following materials: wood, stainless steel, plastic, Teflon, ceramic, enamel, silicone.

The above described winding machine can comprise a sleeve fixed to the motor shaft and protruding beyond the end of the motor shaft. After connecting the motor shaft to the roller axis, the sleeve preferably encloses the roller axis, in particular in form-fit and/or force-fit manner Alternatively or additionally, the motor shaft or the drive shaft and the roller axis are in form-fit and/or force-fit connection. In a further embodiment, the winding machine comprises a protective cup, which is oriented axially to or the axis of which is oriented coaxially with the motor shaft and is axially spaced from the sleeve. Preferably, the cup is attached to the main body and the bottom of the cup protrudes into the main body of the winding machine. In particular, the cup comprises a flange for attaching to the main body.

According to an embodiment, the roller axis and the motor shaft can be connected or inserted into each other by means of a plug connection like a pin connection, wherein the plug connection secures the motor shaft and the roller axis axially to each other. The previously mentioned sleeve can be such a plug connection and encloses the region, in which the connection is located. The plug connection (e.g. the sleeve) secures the connection between roller axis and motor shaft against lateral shift of the roller axis and shift perpendicular to the axis of the motor shaft, respectively, and the rotational axis/roller axis, respectively. This axial securing is advantageous during the pressing operation, in which pressure is exerted on the roller perpendicular to the rotational axis.

The protective cup forms a space (blind hole) recessed from the outer surface of the housing in the main body, in which the motor shaft/sleeve is arranged such that the motor shaft/sleeve is circumferentially or all around accessible in the cup, e.g. for cleaning. The cup comprises a bottom, a circumferential surface adjoining thereto and an open side opposing the bottom, wherein the motor shaft is passed through the bottom and the end of the motor shaft points to the open side of the cup.

The cup can e.g. have a circular or cornered cross-section. A circular cross-section facilitates cleaning such as e.g. wet wiping out with a cloth. The cross-section of the cup in axial direction can be flat or the cup can alternatively at least partially taper from the open side to the bottom. For example, with a tapering cup, dough inadvertently entered the cup can drop/flow out of the cup by means of gravity. Preferably, the cup is formed of an easy to clean material such as e.g. metal or plastic.

The sleeve can comprise at least one outlet opening perpendicular or substantially perpendicular to its axis or the axis of the motor shaft, wherein the outlet opening provides an opening in that region, in which an end of the roller axis engages with an end of the motor shaft, in particular in that region, in which a plug connection between the roller axis and the motor shaft is located. The outlet opening offers an outlet for material such as e.g. dough or other ingredients like sugar coating or the like, which inadvertently gets into the sleeve and would be pressed against the end of the motor shaft in inserting the roller axis into the sleeve. The pushed-in material would thereby impede or even prevent the (secure) connection (e.g. plug connection) between roller axis and shaft. The pushed-in material can exit the sleeve through the outlet opening by inserting the roller axis, whereby a secure connection between roller and shaft is ensured. Preferably, at least the outlet opening is within the protective cup such that material falling out of the outlet opening falls into the cup, from where the material can be simply and hygienically removed.

Particularly preferably, the sleeve comprises at least two outlet openings as described above, in particular two axially opposing outlet openings. In this embodiment, material inadvertently introduced into the sleeve can exit the sleeve on both sides. In addition, with opposing outlet openings, the sleeve can be particularly simply cleaned with disassembled roller axis, e.g. by passing a rod or a brush through both openings, wherein contaminations are pushed out of the sleeve.

A method for winding dough by a winding machine as described above can comprise the following steps:
  inserting/installing an (empty) roller in the winding machine,
  rotating the roller in a first rotational direction by means of a motor,
  helically winding a dough strip or multiple dough strips onto the rotating roller,
  optionally rotating the roller in a second rotational direction opposite to the first one (reversal of the rotational direction of the roller or the motor),
  pivoting and/or actuating a pressing device to the roller such that the wound dough is pressed onto the roller by the pressing device,
  stopping the rotation of the roller (halting the roller),
  removing the wrapped roller (and optionally inserting a new (empty) roller).

The reversal of the rotational or spinning direction is not obligatory. For example, a skilled user can carry out pressing without reversal of the rotational direction. After further practice, the user will carry out pressing of the dough still during winding. For example, a dough strip is wound onto one roller revolution and the pressing device is actuated during further winding (by actuating and/or pivoting) such that the operation of winding+pressing is shortened. Therefore, the method is also to be understood such that the step of pressing the dough onto the roller is at least partially already effected during the step of winding the dough.

Preferably, helically winding the dough onto the roller is effected such that the edge of the previous dough winding laterally adjoins to or abuts on the edge of the subsequent dough winding. A small (compared to the width of the dough strip) distance can also be provided. Alternatively, the edges of juxtaposed dough windings are wound slightly overlapping. For example, the overlap area is less than $1/3$ or less than $1/5$ or less than $1/10$ or less than $1/15$ of the width of the dough strip. In any case, helically winding requires an axial offset of the consecutive dough windings and/or a complete overlap of the dough strips is excluded.

By the winding machine and the method, it is allowed to perform winding the dough and squeezing or pressing the dough in one set-up. I.e. for carrying out the two steps, the roller does not have to be removed from the winding machine.

BRIEF DESCRIPTION OF DRAWINGS

Based on the figures, an embodiment of the invention is explained in more detail.
These show.

DETAILED DESCRIPTION

Figure 1:
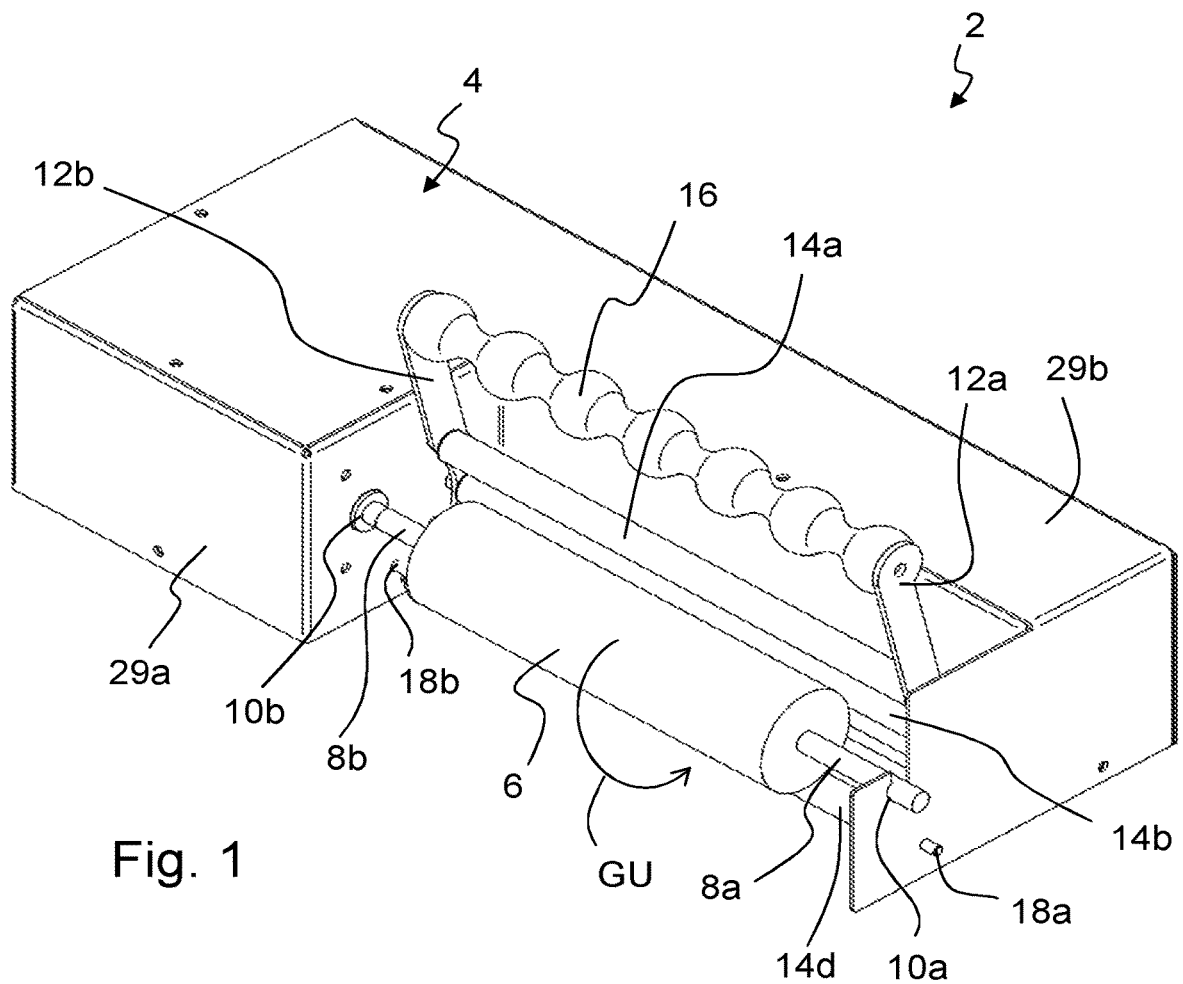
FIG. 1 a perspective view of a dough winding machine,
  FIG. 2 a block diagram for illustrating the functional elements of the winding machine of FIG. 1,
  FIG. 3 a perspective exploded view of the winding machine of FIG. 1,
  FIG. 4 a perspective view of a part of the winding machine of FIG. 1,
  FIG. 5a-d schematic perspective and side views not to scale of a roller of the winding machine of FIG. 1 during winding and pressing a dough strip,
  FIG. 6 a perspective partial view of the winding machine of FIG. 1 with an alternative embodiment of the mount of the roller on the motor shaft, and
  FIG. 7a-b schematic lateral sectional views not to scale of the alternative embodiment of FIG. 6.
Figure 2:
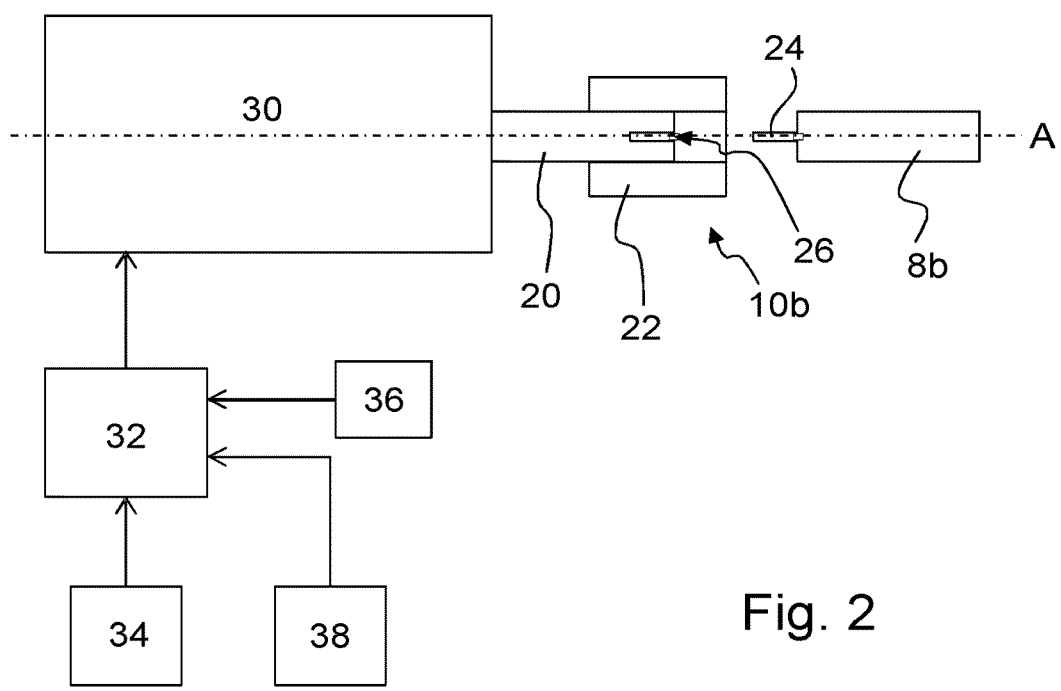

FIG. 1 shows a perspective view of a winding machine 2 for dough or dough strips 40 according to a preferred embodiment. The winding machine 2 comprises: a main body 4, which is formed as a housing in this embodiment or is also referred to as housing herein, and a roller 6 mounted on the main body for winding dough strips. The ends 8 $a$, 8 $b$ of the roller axis are mounted in bearings 10 $a$, 10 $b$ rotatably around a roller rotational axis A (FIG. 5$a$) on the main body 4. An end 8 $b$ of the roller axis is connected to an (electric) motor 30 of the winding machine 2 or to the motor shaft 20 thereof (FIG. 2). A roller grip is provided at the outer end 8 *a* of the roller 6, which is not illustrated in the figures and serves for handling the roller 6. For example, for handling for inserting in and removing from the winding machine 2 and for inserting in and removing from a plaited bun baking oven.

As schematically illustrated in FIG. 2, the end 8 *b* of the roller axis is connected or connectable to the motor shaft 20 via a form-fit plug connection such that the torque of the motor 30 can be transferred to the roller 6. Thereto, a pin 24 is formed on the end face of the roller axis end 8 *b*, which engages with a corresponding slit 26 on the end face of the motor shaft 20. A sleeve 22 fixed to the motor shaft 20 and protruding beyond the end of the motor shaft 20 prevents lateral shift of the roller axis end 8 *b*, if the plug connection is plugged together. The plug connection ensures that the roller 6 can be simply and fast installed and removed, in particular without requiring a tool. Instead of the form-fit plug connection or in addition, a frictionally engaging and/or force-fit plug connection can also be provided.

The opposing end 8 *a* of the roller axis is retained in a bearing 10 *a*, which is formed as a (u-shaped) receptacle open to the top. In inserting/installing the roller 6 in the winding machine 2, the end 8 *a* of the roller axis is laid into the bearing 10 *a* from above. In cooperating with the above described plug connection, the roller 6 can thus be simply and fast installed and removed.

Figure 3:
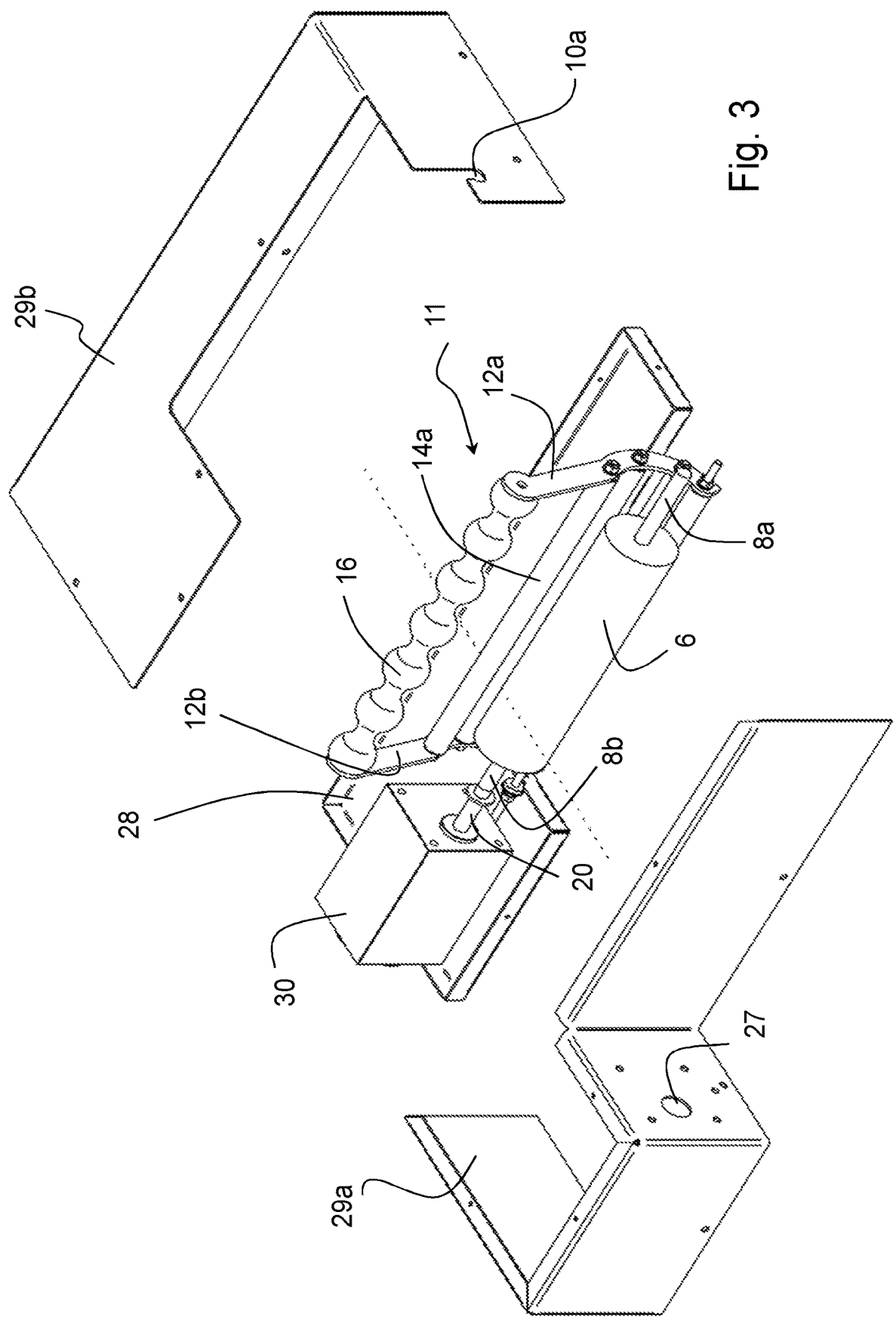
Figure 4:
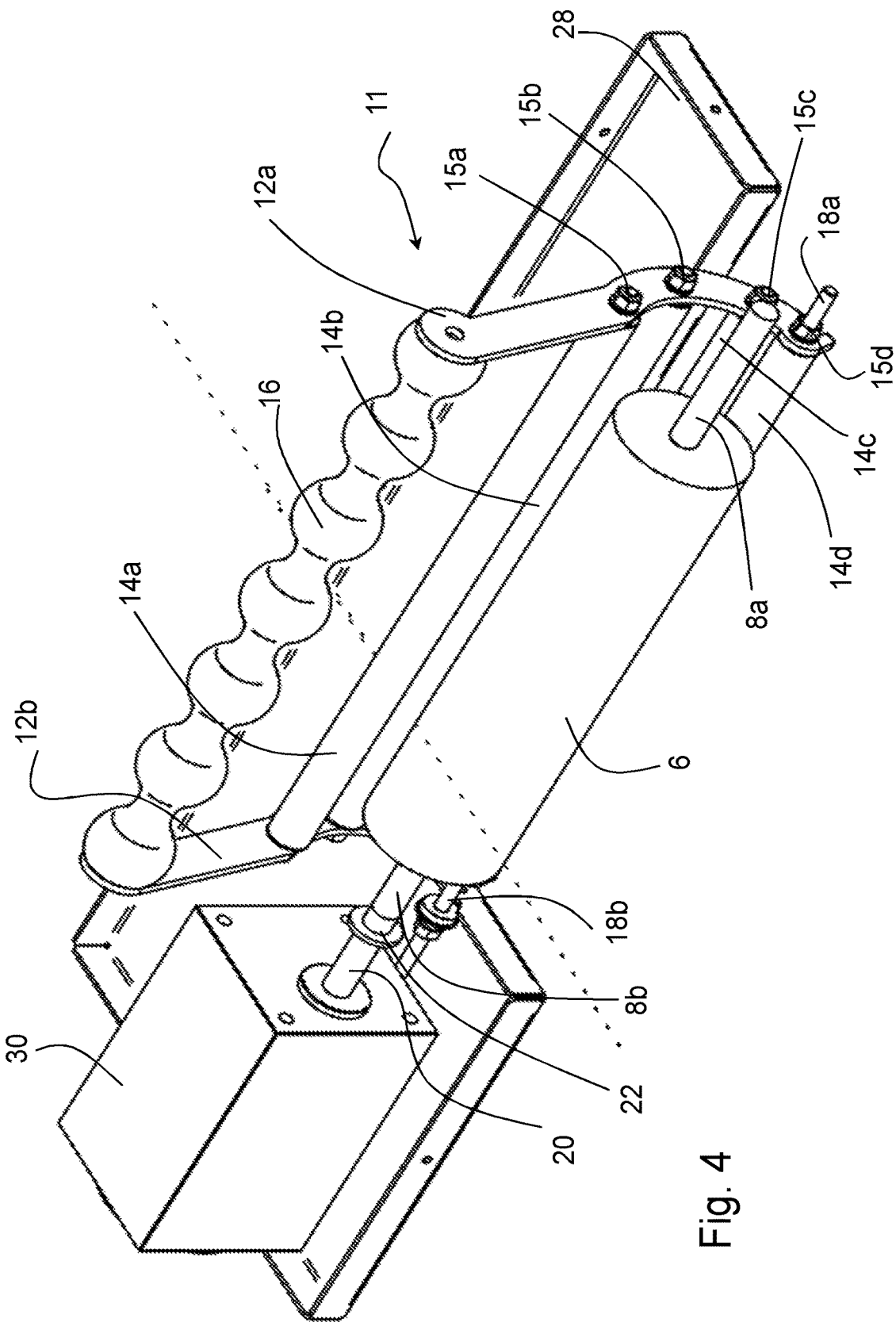

As illustrated in detail in FIGS. 3 and 4, the winding machine 2 further comprises a pressing device 11, by means of which dough wound onto the roller 6 can be pressed flat or can be pressed onto the roller 6. The pressing device 11 preferably comprises one or more pressing rolls 14 *a-d*, a mount with two side parts 12 *a-b* for fixing the rolls 14 *a-d* and a grip element 16. The two side parts 12 *a-b* of the mount are connected to each other via the roll axes 15 *a-d* (FIG. 4) and the grip element 16. The pressing device 11 is mounted on the main body 4 via two bearing pins 18 *a-b* in rotatable or pivotable manner, such that the pressing rolls 14 *a-d* can be pivoted to the roller 6. In this embodiment, the two bearing pins 18 *a-b* are formed in extension of the lowest pressing roll axis 14 *d*.

Preferably, the axes 15 *a-d* of the pressing rolls 14 *a-d* are (in each pivot position) parallel to the roller axis of the roller 6. In this embodiment, the pressing rolls 14 *a-d* and the roller 6 are cylindrically formed, wherein the circumferential surface of the roller 6 (in each pivot position) is parallel to the circumferential surfaces of the pressing rolls 14 *a-d*. Thereby, the contact pressure is uniformly distributed and a uniform thickness of the dough pressed flat is ensured during the pressing of the wound dough. Alternatively (not illustrated), both the roller and the pressing rolls can have a shape tapering along the roller axis, e.g. a conical shape or frustoconical shape, wherein the circumferential surface of the roller (in each pivot position) is parallel to the circumferential surfaces of the pressing rolls in this embodiment too. A tapering, e.g. conical or frustoconical, shape of the roller facilitates detachment of the baked dough from the roller.

The roller 6 and/or the pressing rolls 14 *a-d*, in particular the (outer) surfaces of the roller 6 and/or the pressing rolls 14 *a-d*, coming into contact with dough can be formed of at least one of the following materials or be coated with at least one of the following materials: wood, stainless steel, plastic, Teflon, ceramic, enamel, silicone. Particularly preferably, the roller 6 and/or the pressing rolls 14 *a-d* are formed of wood or plastic.

FIG. 3 shows a perspective exploded view of the winding machine of FIG. 1. The main body or the outer housing 4 is formed of multiple elements 28, 29 *a-b*. Preferably, easy to clean and stable stainless steel sheet is used as the material for the housing. Alternatively, plastic can be used. Preferably, the motor 30 is attached to a bottom part 28 of the main body 4 or to a side element 29 *a*. Preferably, a front housing element 29 *a* is on the front side of the machine 2 (points to a user of the machine 2) and comprises a passage opening 27 for the motor shaft 20. A rear housing element 29 *b* terminates the main body 4 to the rear and to the top. All of the elements 28, 29 *a-b* are connected to each other and form the stable main body or the stable housing 4 for the winding machine 2.

FIG. 2 shows a block diagram for illustrating the functional elements of individual components of the winding machine 2 of FIG. 1. The motor 30 is controlled via a control 32 of the winding machine 2. A first switching element 34 (on/off switch) for switching on and off the motor 30, a second switching element 36 (direction changer) for switching the rotational direction of the motor 30 and optionally a speed regulator 38 for adjusting a desired rotational speed of the motor 30 are connected to the control 32. Preferably, at least the second switching element 36 (the direction changer) is formed as a foot switch such that a user has both hands free for handling the dough during use of the winding machine 2. Particularly preferably, the first switching element 34 (the on/off switch) is additionally formed as a foot switch for the same reason. Alternatively, the second switching element 34 can be arranged on the main body 4.

As schematically illustrated in FIG. 5*a-d* not to scale, the use of the winding machine 2 illustrated in FIG. 1 to FIG. 4 is exemplarily described below. Unless otherwise stated, the components illustrated and described with respect to FIG. 5*a-d* correspond to the components of the winding machine 2 described above with respect to FIG. 1 to FIG. 4.

Figures 5A, 5B:
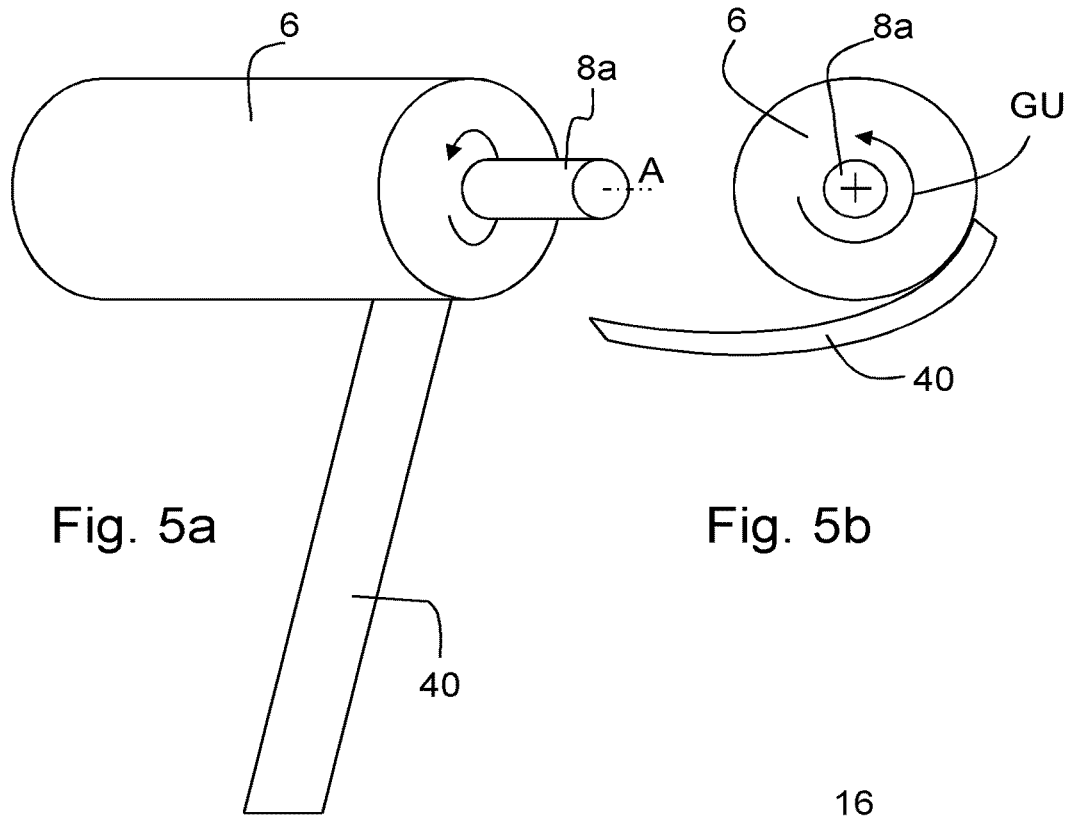

If not yet present, an (empty) roller 6 is installed in the winding machine 2 in a first step, in that the one end 8 *b* of the roller axis is manually inserted into the above described plug connection and the other end 8 *a* of the roller axis is inserted into the bearing 10 *a* open to the top. Subsequently, the motor 30 is activated or switched on such that it rotates in a first rotational direction (FIG. 5*a*). The first rotational direction or the first sense of rotation is indicated by GU in FIGS. 1 and 5 *b* and is counterclockwise with a view to the right side of the winding machine 2.

Figures 5C, 5D:
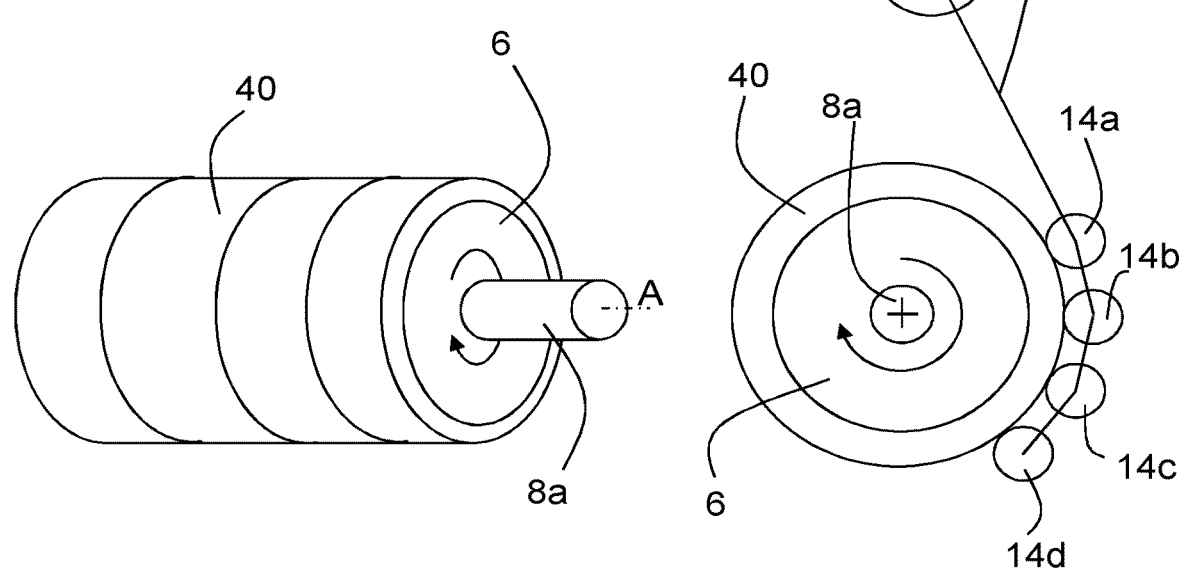

Preferably, the first rotational direction GU is counterclockwise (left-hand rotating) such that if a dough strip 40 is applied onto a lower side of the roller 6 in a subsequent step (FIG. 5*b*), the dough strip 40 is pulled from the bottom to the rear across the rear side of the roller 6 (viewed from a user). The dough strip 40 is helically wound onto the rotating roller 6 until the desired length of the dough strip is wound onto the roller. Related to the axial distribution on the roller, the dough strip of the desired length can cover the entire or substantially the entire roller 6 with dough 40 as illustrated in FIG. 5*c*. Alternatively, the wound dough for example covers only half or ¾ of the axial length of the roller, wherein an end of the roller remaining free facilitates stripping the baked dough.

In an optional step, after winding the dough onto the roller, the rotational direction of the motor 30 is subsequently reversed such that the roller 6 rotates clockwise (right-hand rotating) and the wound dough 40 is pressed or pressed flat onto the roller 6 by means of the pressing device 11. The reversal of the rotational direction of the roller 6 in pressing the dough prevents adhesion of the wound dough 40 to the pressing rolls 14 *a-d*. With a skilled operator, the reversal of the rotational direction can be omitted and pressing the dough onto the roller can be effected after or even during winding, whereby time can be saved.

As shown in FIG. 5*d* by the schematically illustrated pressing device (with pressing rolls 14 *a-d*, side part 12 *a* and grip 16), the pressing device 11 is pivoted around the axis 15 *d* of the lowest pressing roll 14 *d* such that the at least one, all or substantially all pressing rolls 14 *a-d* press the dough 40 onto the roller 6.

Finally, the motor 30 is stopped or switched off and the roller 6 with the dough 40 pressed flat is removed from the winding machine 2. The dough 40 is baked on the roller 6 by rotating above a heat source (e.g. electric grill, gas grill, charcoal grill, open fire) and can then be pushed from the roller 6.

After removing the roller 6 wrapped with dough from the winding machine 2, a new (empty) roller 6 can be immediately installed, which can subsequently again be fast and simply wrapped with dough 40 as described above.

Figure 6:
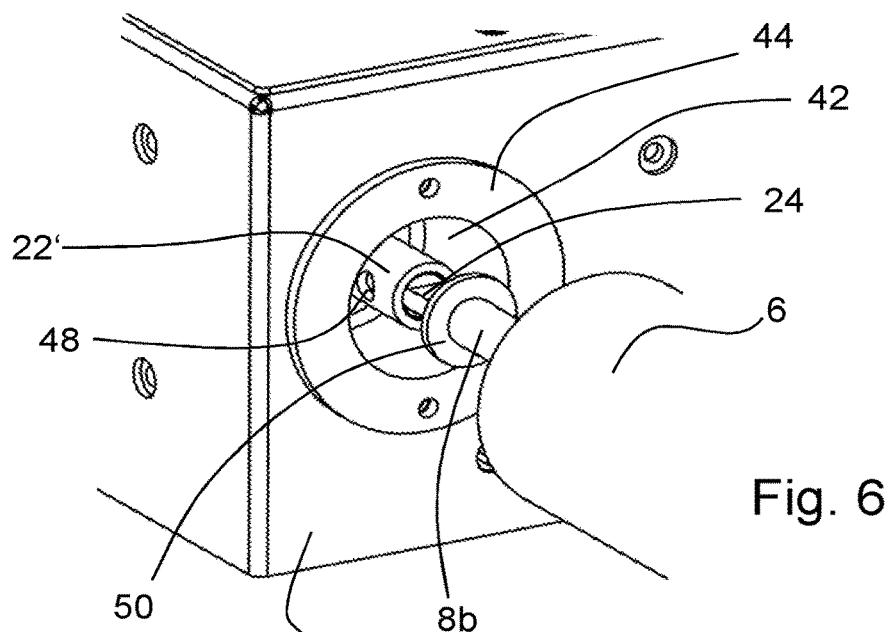
Figure 7A:
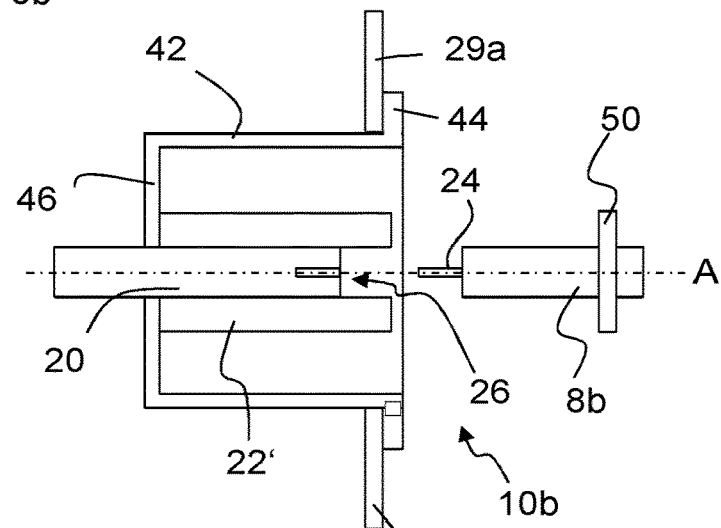
Figure 7B:
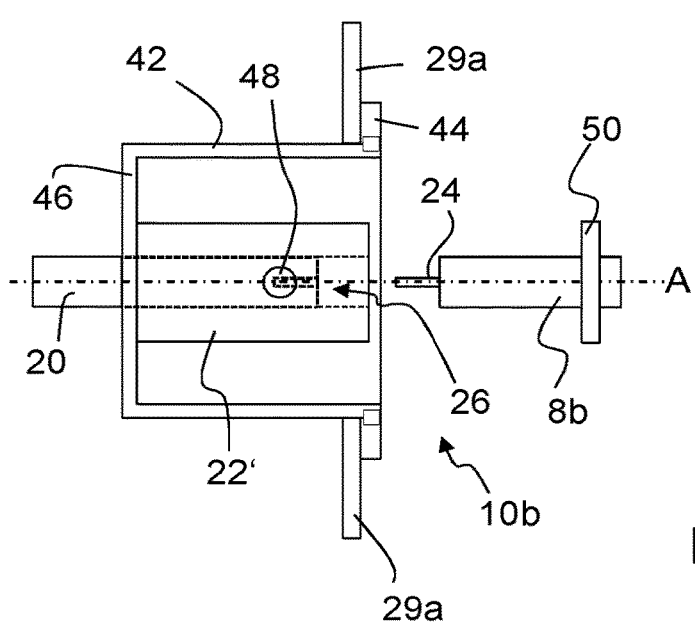

FIG. 6 shows a perspective partial view of the winding machine 2 of FIG. 1 with an alternative embodiment of the mount of the roller axis 8 *b* on the motor shaft 20. FIG. 7*a* and FIG. 7*b* show schematic lateral sectional views not to scale of the alternative embodiment of FIG. 6.

In this embodiment, the winding machine 2 comprises a protective cup 42, which is attached to the housing 4 or housing element 29 *a*, wherein the cup bottom 46 protrudes into the housing 4 or the main body and thereby forms a space (blind hole) recessed from a front side/front surface of the housing 4. The cup 42 is arranged axially to or coaxially with the motor shaft 20 or axis A and spaced from a sleeve 22' such that a (circumferential) free space is provided between the inner side of the circumferential surface of the cup 42 and the outer side of the sleeve. In this embodiment, the cup 42 is cylindrically formed such that the inner side of the cup 42 can be easily cleaned. The cup 42 comprises a circumferential flange 44 at its edge, which serves as a stop and for attaching to the housing 4 or element 29 *a*. Preferably, the cup 42 is formed of easy to clean plastic.

Optionally, a dough protective ring 50 encompassing the axis 8 *b* is provided on the roller axis 8 *b*, which prevents or at least reduces a contamination of the end of the roller axis 8 *b*, at which the (pin) connection is located.

As schematically illustrated in FIG. 7*a* (section in the plane of the roller axis A) and described above with respect to FIG. 2, the connection between roller axis 8 *b* and motor shaft 20 is exemplarily illustrated as a pin connection: A pin 24 on the roller 8 *b* engages with a correspondingly configured slit 26 at the end of the motor shaft 20 in form-fit and/or force-fit manner A sleeve 22' attached to the motor shaft 20 extends from the cup bottom 46 up to or substantially up to the opening of the cup 42. As illustrated in FIG. 6 and FIG. 7*b* (sleeve 22' not sectioned), the sleeve 22' comprises an outlet opening 48 perpendicular to the axis A in the region of the (pin) connection between shaft 20 and roller axis 8 *b*. The outlet opening 48 can e.g. be a bore. Contaminations (e.g. dough residues, sugar), which have inadvertently entered the sleeve 22', can be pushed out through the outlet opening 48 in inserting the roller axis 8 *b* into the sleeve 22'. Thereby, a secure connection of the roller 6 to the motor shaft 20 is ensured. Contaminations are collected in the cup 42 and can there be simply and hygienically removed. Particularly preferably, two opposing or more than two outlet openings 48 are provided in the sleeve 22'. Thereby, contaminations can be pushed out on both or multiple sides of the sleeve 22'. In addition, contaminations can be pushed out of the sleeve 22' with non-inserted roller 6 in that e.g. a rod or a brush is pushed through the two openings 48.

LIST OF REFERENCE NUMERALS 2 winding machine
4 main body/housing
6 roller
8 *a-b* end of the roller axis
10 *a-b* roller bearing
11 pressing device
12 *a-b* mount pressing device
14 *a-d* roll
15 *a-d* roll axis
16 grip element
18 *a-b* bearing pin pressing device
20 motor shaft
22, 22' sleeve
24 pin
26 slit
27 passage opening
28 bottom element
29 *a*, 29 *b* housing element
30 motor
32 control
34 first switching element/on/off switch
36 second switching element/direction change
38 speed regulator
40 dough/dough strip
42 protective cup
44 cup flange
46 cup bottom
48 outlet opening
50 dough protective ring

What is claimed is:

1. A winding machine for dough comprising:
a main body;
a first roller mounted on the main body rotatably around a rotational axis;
wherein in use of the winding machine, a dough strip can be wound onto the first roller, such that a circumferential surface of the first roller is wrapped with dough;
a motor for rotationally driving the first roller, wherein a motor shaft of the motor is detachably connected to a roller axis of the first roller; and
a pressing device for pressing dough rolled up on the first roller onto the first roller, the pressing device comprising:
a first arm and a second arm, the first arm being pivotably connected to the main body at a first pivot point and the second arm being pivotably connected to the main body at a second pivot point, wherein a line through the two pivot points defines a rotation axis of the pressing device,
a handle connected between the two arms for pivoting the pressing device, and
a second roller rotatably supported between the two arms,
wherein the second roller is disposed between the rotation axis and the handle such that the handle can be used to adjust the second roller towards the first roller, for pressing the dough wrapped on the first roller onto the first roller,
wherein the first roller has a conical or frustoconical shape to facilitate the detachment of a baked dough and the second roller is mounted rotatably around a roller rotational axis.

2. The winding machine according to claim 1, wherein the motor shaft of the motor is form-fit and/or force-fit and/or frictionally engaged with the roller axis of the first roller for transferring torque from the motor to the first roller.

3. The winding machine according to claim 1, wherein at least one end of the first roller comprises a first form-fit and/or force-fit and/or frictionally engaged element which engages with a second form-fit and/or force-fit element of the motor in a form-fit and/or a force-fit and/or a frictionally engaging manner for transferring torque of the motor to the first roller.

4. The winding machine according to claim 1, further comprising a third roller adjustable towards the first roller, also for pressing dough rolled up on the first roller onto the first roller.

5. The winding machine according to claim 1,
further comprising a mount on which the second roller is rotatably mounted, and
wherein the mount is mounted on the main body so as to be actuatable, pivotable, or rotatable therewith.

6. The winding machine according to claim 5,
wherein the mount is biased towards the first roller by means of at least one spring element, and/or
wherein the mount is fixable in a rest position spaced from the first roller by means of at least one retaining element.

7. The winding machine according to claim 1,
wherein the winding machine comprises a first switching element connected to a control unit for switching on/off the motor, and
wherein the first switching element comprises a pedal, and/or
wherein the winding machine comprises a second switching element connected to the control unit for reversing the rotational direction of the motor.

8. The winding machine according to claim 1, comprising a control unit, wherein the winding machine comprises a control element connected to the control unit for controlling a rotational speed of the motor, for variably controlling the rotational speed.

9. The winding machine according to claim 1,
wherein a rotational speed of the motor in at least one rotational direction is between 30-250 min$^{-1}$, and/or
wherein the motor is an electric motor.

10. The winding machine according to claim 1, further comprising
a sleeve fixed to the motor shaft and protruding beyond an end of the motor shaft, wherein the sleeve form-fit encloses the roller axis after connecting the motor shaft to the roller axis, and
a protective cup oriented axially to the motor shaft and axially spaced from the sleeve, wherein the cup is attached to the main body and a bottom of the cup protrudes into the main body, wherein the cup comprises a flange for attaching to the main body.

11. The winding machine according to claim 10, wherein the sleeve comprises at least one outlet opening disposed perpendicular to the axis of the motor shaft, wherein the outlet opening provides an opening in a region, wherein an end of the first roller axis engages with an end of the motor shaft in the region, wherein a plug connection between the first roller axis and the motor shaft is located in the region, and wherein the sleeve comprises at least two axially opposing outlet openings.

12. A method for winding dough with a winding machine, the winding machine comprising
a main body;
a first roller mounted on the main body rotatably around a roller axis, the first roller having a conical or frusto-conical shape;
a motor for rotationally driving the first roller, wherein a motor shaft of the motor is detachably connected to the roller axis;
a pressing device for pressing dough rolled up on the first roller onto the first roller, the pressing device comprising a first arm and a second arm, the first arm being pivotably connected to the main body at a first pivot point and the second arm being pivotably connected to the main body at a second pivot point, wherein a line through the two pivot points defines a rotation axis of the pressing device;
a handle connected between the two arms for pivoting the pressing device; and
a second roller rotatably supported between the two arms and disposed between the rotation axis and the handle such that the handle can be used to adjust the second roller towards the first roller;
wherein the method comprises:
helically or spirally winding a dough strip onto the first roller such that an edge of a first winding of the dough strip laterally adjoins to, or abuts, an edge of a second winding of the dough strip subsequently wound onto the first roller,
pivoting the pressing device or actuating the pressing device of the winding machine towards the first roller such that the dough strip is pressed onto the first roller by the second roller, and
stopping the rotation of the first roller, wherein after stopping the rotation of the first roller, which is at least partially wrapped with dough, the first roller is removed from the winding machine and a further empty second roller is installed in the winding machine,
baking the dough strip wound onto the first roller by rotating the first roller above or in front of a heat source to create a baked dough, and
detaching the baked dough from the first roller.

13. The method for winding dough according to claim 12, wherein after winding the dough strip and before pivoting or activating the pressing device, the first roller is rotated in a second rotational direction, which is opposite to the first rotational direction.

* * * * *